Figure 1:
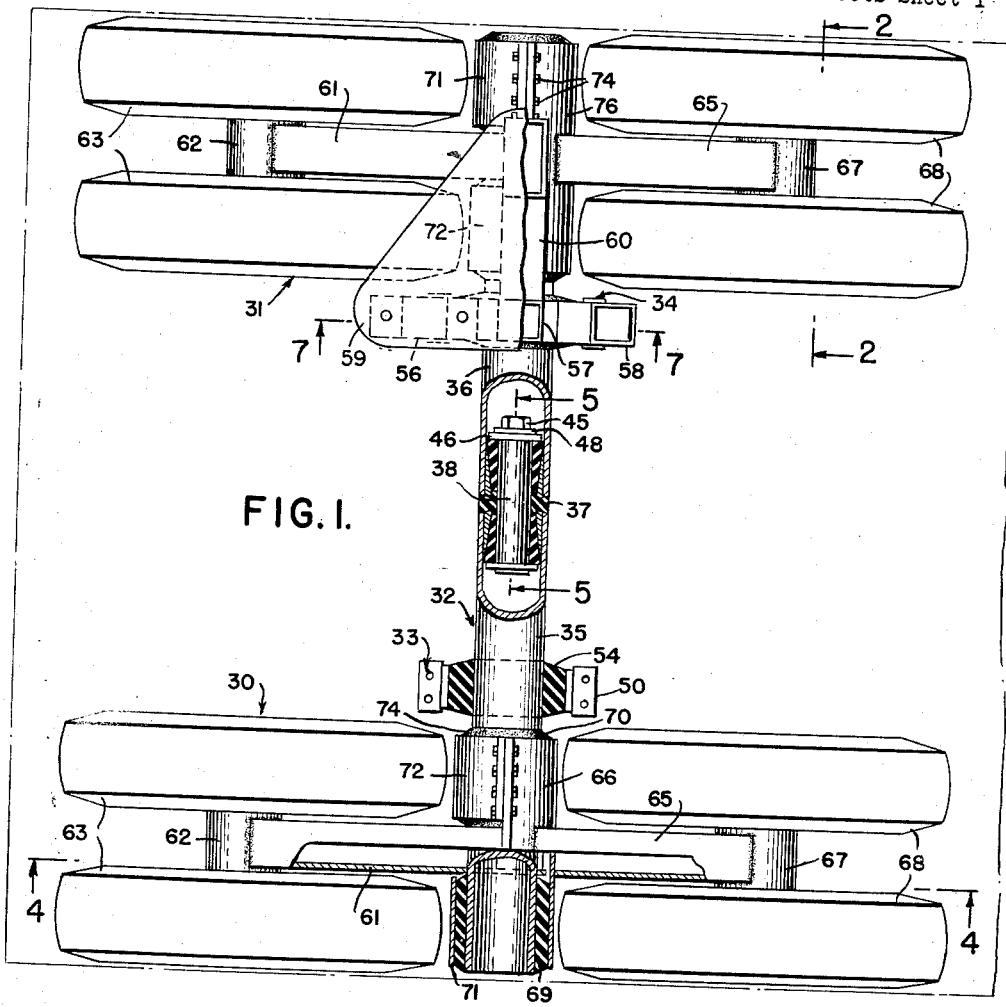

Sept. 6, 1960     E. H. WILLETTS     2,951,710
TANDEM AXLE TORSIONAL SUSPENSION FOR VEHICLES
Filed Dec. 18, 1956     4 Sheets-Sheet 1

INVENTOR.
Elwood H. Willetts
BY
L. S. Saulsbury
ATTORNEY

Sept. 6, 1960    E. H. WILLETTS    2,951,710
TANDEM AXLE TORSIONAL SUSPENSION FOR VEHICLES
Filed Dec. 18, 1956    4 Sheets-Sheet 2

INVENTOR.
Elwood H. Willetts
BY
L. S. Saulsbury
ATTORNEY

Sept. 6, 1960 E. H. WILLETTS 2,951,710
TANDEM AXLE TORSIONAL SUSPENSION FOR VEHICLES
Filed Dec. 18, 1956 4 Sheets-Sheet 3

INVENTOR
ELWOOD H. WILLETTS

BY L. S. Saulsbury
ATTORNEY

Sept. 6, 1960 E. H. WILLETTS 2,951,710
TANDEM AXLE TORSIONAL SUSPENSION FOR VEHICLES
Filed Dec. 18, 1956 4 Sheets-Sheet 4
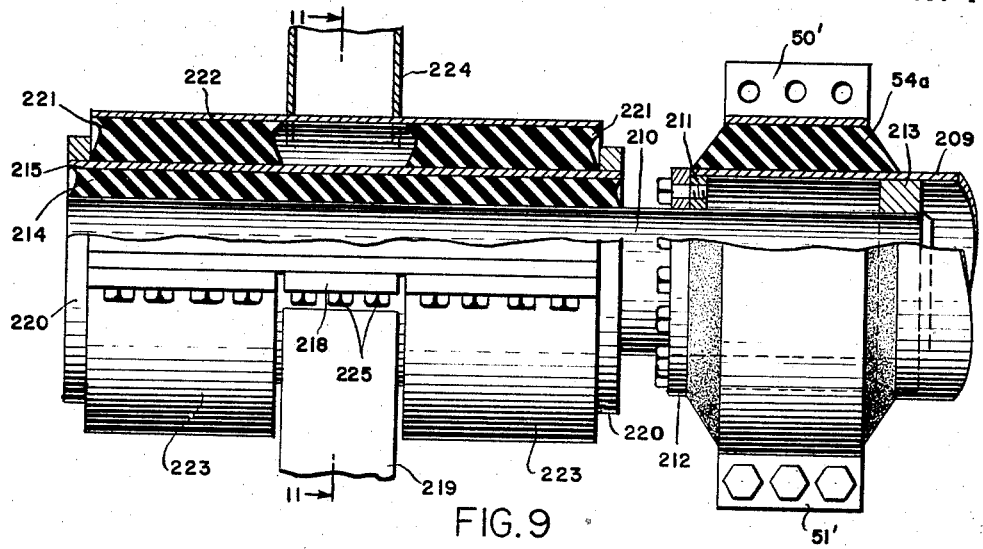
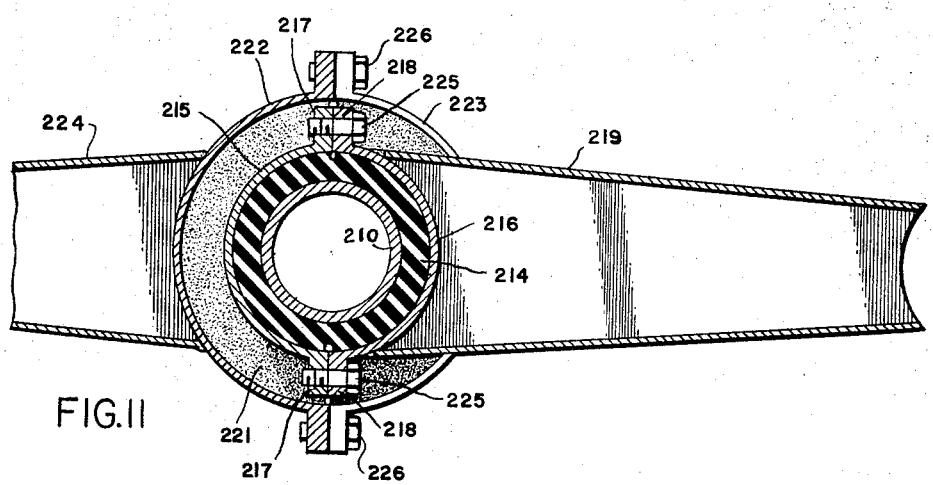
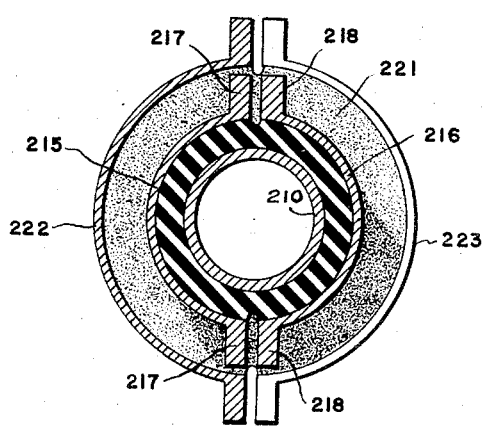
INVENTOR.
ELWOOD H. WILLETTS
BY L. S. Saulsbury
ATTORNEY

United States Patent Office 2,951,710
Patented Sept. 6, 1960

2,951,710

TANDEM AXLE TORSIONAL SUSPENSION FOR VEHICLES

Elwood H. Willetts, 320 Kenmore Road, Douglaston, N.Y.

Filed Dec. 18, 1956, Ser. No. 629,110

7 Claims. (Cl. 280—104.5)

This invention relates to a tandem dead axle torsional suspension for vehicles, in which the load is resiliently supported through torsionally stressed rubber bushings secured to opposing suspension arms mounted on opposite ends of a cross biasing trunnion shaft resiliently mounted to afford some degree of self-steering during movement of the vehicle.

It is the principal object of the present invention to provide a cushioned wheel suspension which will preserve relative cushioned alignment of all wheels of the suspension while providing transverse stabilizing as well as a true self-steering effect upon a vehicle supported by the suspension.

It is another object of the invention to provide a unitary suspension structure in which each of the wheels thereof may rotate and transmit brake torque independently of the others while each pair of adjacent wheels is being cushioned against the vertical irregularities in the road surface independently of and relative to other pairs of wheels.

It is still another object of the invention to provide a torsional wheel suspension in which the suspension torque reactions on each side of the vehicle are stabilized within each pair of opposing suspension arms rather than through the vehicle structure and in which the differential torque reaction of the suspension arms on one side of the vehicle is resiliently transferred to the suspension arms at the other side thereof thereby stabilizing transverse alignment of the vehicle, and without the use of supplemental torque arms, radius rods, sway bars or other self leveling means.

It is still another object of the invention to provide a tandem axle wheel suspension wherein rubber bushings which carry the main torque load of the vehicle are placed in angular shear and vulcanized only in their inner surfaces to a cross shaft and wherein the one suspension arm may be rigidly secured to the cross shaft while the opposing suspension arm member of each pair is adjustably clamped in compression against their outer surfaces of the rubber bushings whereby to facilitate the manufacture, assembly and adjustment thereof upon the bushings to the desired torsional capacity.

It is still another object of the invention to provide a torsionally stabilized suspension arms structure in which the inner rubber bushings are vulcanized to an inner cross shaft and to encircling half length tubular hub members spaced apart from each other during vulcanization, and so arranged that shrinkage of the rubber during cooling to atmospheric temperature will reduce the end clearance between the adjacent hub members whereupon said hub members may be secured together thus deforming the rubber and compressing it against the bonded surfaces encompassing it against the bonded surfaces encompassing the rubber thereby to improve the bond for torsional stress, and in which outer rubber bushings are also vulcanized to the exterior of said half length hub members.

It is still another object of the invention to provide a tandem axle torsional suspension in which concentric inner and outer rubber torsional suspension bushings are bonded or vulcanized on their inner and outer diameters to metallic sleeves split radially and to an inner cross shaft wherein the split halves of the inner and outer sleeves are spaced apart during the curing and bonding of the tubular rubber bushings thereto, in order that the separated halves of the sleeves may freely move toward each other as the molded rubber shrinks during cooling, and that the volume of rubber at atmospheric temperature will yet exceed the volume of the closed sleeve halves which may then be clamped together, deforming the rubber under compression to improve the bonds of said bushings with the metallic sleeves and cross shaft.

It is still another object of the invention to provide a rubber cushioned wheel suspension wherein the torsional resistance bushings for opposing torque reactive suspension arms, the bushings for the torque transfer through the cross shaft and mounting structure bushings may be embodied in a single assembly mounted upon the end of the cross shaft and upon the side of the vehicle.

It is a still further object of the invention to provide a durable shock absorbing suspension of simple and compact construction, which will delay the transfer of road impact shocks from one pair of wheels to all of the other pairs of wheels in proportion to their relation to the path of travel over a given irregularity of the road surface.

It is a still further object of the invention to provide in a tandem axle wheel suspension a resiliently mounted trunnion cross shaft having a self-adjusting load support bearing for the connection of the suspension to the vehicle that will stabilize the self-steering effect throughout the range from full load to empty during movement of the vehicle.

It is a still further object of this invention to combine inner pairs of endwise clamped rubber bushings and outer pairs of radially clamped rubber bushings in balanced proximity to the center of the tire path of each pair of tires so as to preserve running alignment of all tires through providing uniform resistance to each tire against a given irregularity of road surface as well as where a road irregularity similarly affects both tires of a pair on any such support arm equally, as is had at every single road joint on all concrete roads, and therein differing from prior suspensions where such single suspension arm and its supporting tires at ground are offset from the center of the torsional cushioned resistance whereby the tire farthest beyond the center of torsional resistance is diverted a greater extent from the normal tire path by a given irregularity of road surface than its pair mate tire less distant from the center, and both tires of such an offset arm are deflected from their true normal path at the expense of increased rolling resistance and tire wear.

Other objects of the present invention are to provide a tandem axle wheel suspension where the load is carried through resilient rubber bushings or discs, in which the parts of the suspension are kept to a minimum, are easily assembled upon one another, durable and will have long life, where the rubber bushing material is so shaped and positioned within the suspension as to have the greatest resistance with minimum amount of rubber, in which the parts can be easily replaced, efficient and effective in use.

Figure 2:
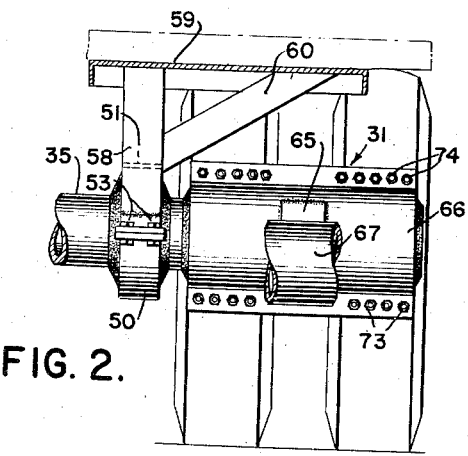
Figure 3:
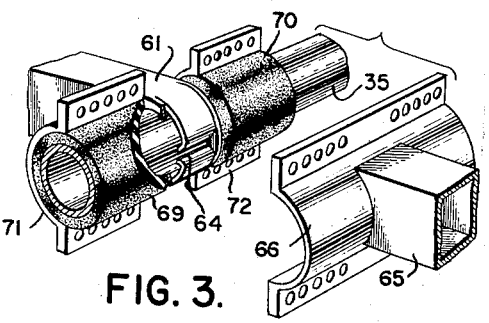
Figure 4:
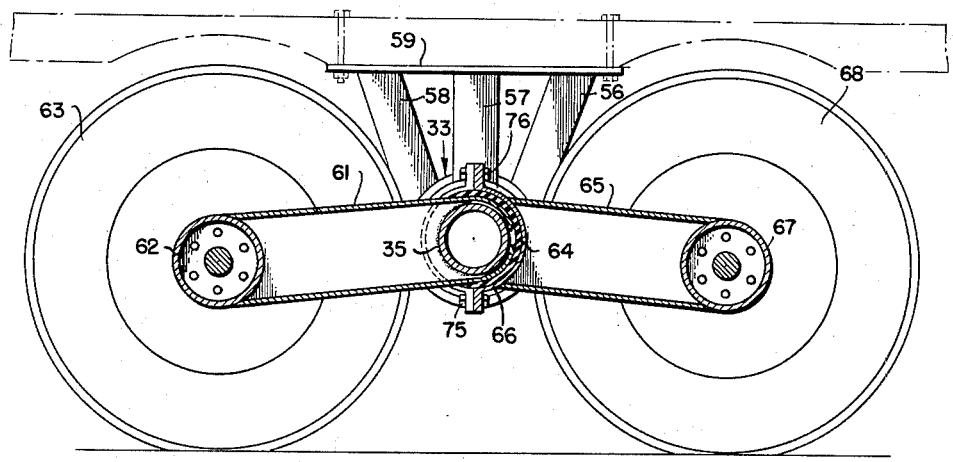
Figure 5:
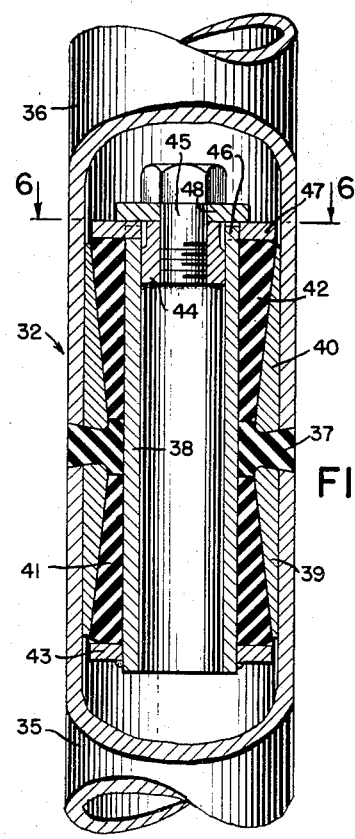
Figure 6:
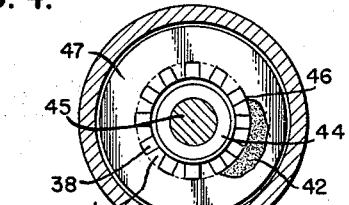
Figure 7:
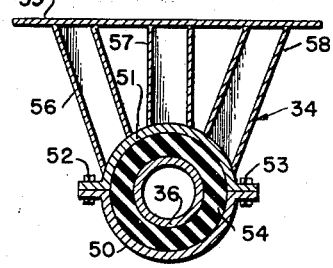
Figure 5A:
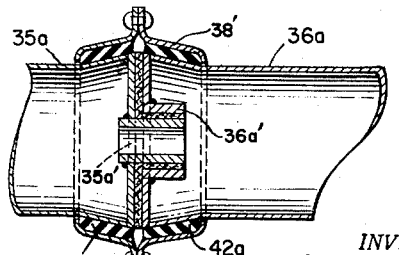
Figure 8:
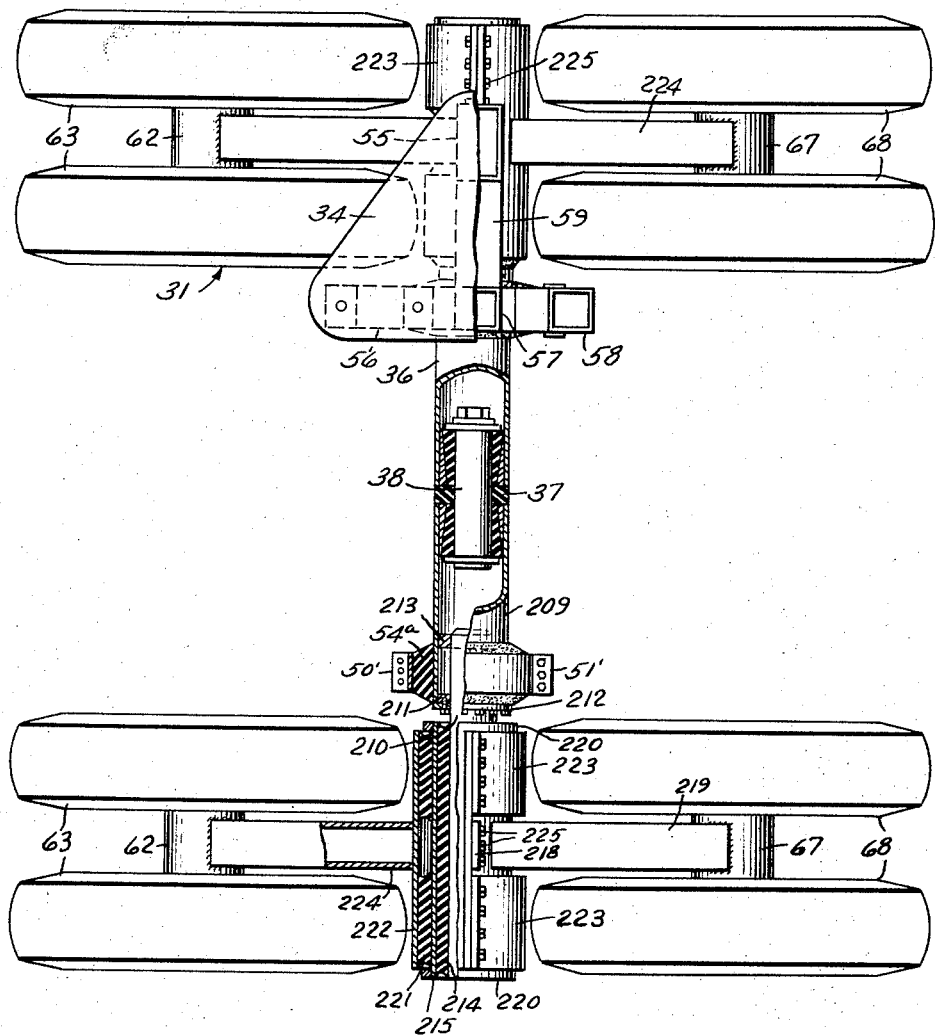

For other objects, and for a better understanding of the invention, reference may be had to the following detailed description taken in connection with the accompanying drawing, in which Figure 1 is a top plan view of a full suspension structure having a divided cross shaft with torsional freedom between the ends of the shaft and portions broken away through the torsional stabilizer connection and one side of the structure to show the interior construction thereof, Fig. 2 is a fragmentary elevational view of one side of the structure taken generally on line 2—2 of Fig. 1 and looking upon the forward wheels, Fig. 3 is a fragmentary exploded view of one side of the structure, looking upon the rubber bushings and the suspension arm clamp parts, Fig. 4 is a longitudinal sectional view of one side of the structure taken along line 4—4 of Fig. 1, Fig. 5 is an enlarged longitudinal sectional view of the resilient cross shaft torque stabilizing connection and taken generally on line 5—5 of Fig. 1, Fig. 5a is a longitudinal sectional view of a modified form of a resilient cross shaft torque stabilizing connection similar to the connection shown in Fig. 5 and wherein the rubber member is externally arranged on the cross shaft members, Fig. 6 is a vertical sectional view of one end of the cross shaft torque stabilizing connection, the view being taken on line 6—6 of Fig. 5, Fig. 7 is a vertical sectional view of one of the cross shaft rubber mounting structures as viewed on line 7—7 of Fig. 1, Fig. 8 is a top plan view partly in section of a full suspension structure showing the modification of the divided cross shaft with an end connection composed of a pair of rubber bushings connected to the wheel arms, Fig. 9 is a fragmentary longitudinal sectional view of still another modified form of the invention in which the inner and outer sleeves are vulcanized to the inner and outer rubber bushings respectively so as to offset the shrinkage of the rubber bushings as they cool to atmospheric temperature, Fig. 10 is a transverse sectional view illustrating the separation of the concentrically arranged split sleeve assemblies as molded with clearance between half flanges to account for the shrinkage in cooling, and Fig. 11 is a transverse sectional view taken on line 11—11 of Fig. 9.

Referring now particularly to Figs. 1 to 7, 30 and 31 represent respectively torque-reactive, longitudinally-extending, wheel-carrying, opposing suspension arm structures connected together by a divided cross shaft structure 32. Each arm structure of the suspension is similar in construction to the other, except one structure is adapted for the left side of the trailer or truck while the other arm structure is adapted for the right side thereof.

The cross shaft structure 32 is formed of axially-aligned divided parts or two tubes 35 and 36 on the outer ends of which the suspension arm structures 30 and 31 are respectively mounted. These tubes are connected with one another through a torsional stabilizing connection that normally retains said tubes resiliently against rotational and angular displacement relative to one another. The inner ends of the tubes 35 and 36 abut a resilient rubber ring 37 that is carried on an internal bolt sleeve 38, Fig. 5. The ends of the sleeves 35 and 36 respectively have internally-tapered liners 39 and 40 brazed into the tubes and their thickened ends also engage the rubber ring 37. Fitted within the liners and also abutting the rubber ring 37 are opposed rubber externally-tapered bushings 41 and 42. These bushings are carried on the bolt sleeve 38.

The bolt sleeve 38 has a washer 43 welded thereto so as to be drawn against the outer end of the tapered rubber bushing 41. The other end of the bolt sleeve 38 has a nut 44 welded therein and is adapted to receive a securing bolt 45. The same end of the bolt sleeve 38 has serrations 46 for receiving internal serrations 47' of a washer 47, Figs. 5 and 6. A washer 48 is applied with the bolt 45 against the serrated washer 47 and as the bolt 45 is tightened the washers 43 and 47 are respectively brought into tight frictional engagement with the enlarged ends of the respective tapered rubber bushings 41 and 42 so as to longitudinally compress these bushings into the space provided between the bolt sleeve 38 and the liners 39 and 40 and to provide a torsionally-biasing resilient connection between the divided cross shaft parts 35 and 36.

While Fig. 5 shows a resilient connection located internally of the cross shaft, it is understood that rubber bushings may be vulcanized as shown in Fig. 5a at 41a and 42a to the exterior of tubes 35a and 36a and compressed inwardly against the tubes by a split sleeve 38' to provide the torsionally-biasing resilient connection between the divided cross shaft parts. A centering member 35a' is carried on the tube 35a and is resiliently connected to a center sleeve 36a' on the tube 36a.

The cross shaft structure 32 is mounted under the vehicle chassis by means of laterally-spaced resilient mountings 33 and 34. Each mounting has lower and upper flanged separable sleeve halves 50 and 51 that are joined to one another by securing bolts 52 and 53 and about a rubber bushing 54 that is vulcanized upon tube 35 or 36. The upper sleeve half 51 has brace attaching arms 56, 57 and 58 extending upwardly therefrom with their ends welded to an attaching plate 59 adapted to be bolted to the underside of the vehicle chassis. A further brace arm 60 is welded to the center arm 57 and to the attaching plate 59.

Each suspension arm structure 30 or 31 comprises a forwardly-extending arm 61 of rectangular tubing which has its opposite ends cut away for a welded connection with brake anchorage and spindle hub 62, which carries a pair of wheels 63, and welded at 64 to the cross shaft tube 35 or 36, Figs. 3 and 4.

A rear arm 65 of rectangular tubing has a flanged separable clamp part 66 secured to its forward end and a brake anchorage and spindle hub 67 secured to its rearward end on which wheels 68 are mounted. The separable clamp part 66 has spaced rubber sleeve bushings 69 and 70 connected to the cross shaft tube 35 or 36. Lying on the opposite sides of the suspension arm 61 are flanged clamp parts 71 and 72. These clamp parts 71 and 72 are joined with the flange part 66 by bolts 73 and 74. Any up and down movement of the wheels 63 and 68 may be had independently of one another and the torque reaction of any such movement is stabilized through the rubber sleeve bushings 69 and 70 and the opposing arm.

The load of the vehicle on the cross shaft 32 is carried through the suspension arms 61 and 65 and wheels 63 and 68 to the ground. The torsional movement created on the tube 35 or 36 by arm 61 is transmitted through the rubber bushings 69 and 70 to the arm 65. Torsional movement created on arm 65 will be transmitted in the opposite direction to the arm 61. Since there is provided a resilient torque connection in the cross shaft, independent resisted movement can be had of the arms of one suspension arm structure relative to the other suspension arm structure. The resilient torque connection in the cross shaft is of adequate capacity to preserve the coaxial alignment of the two tubes 35 and 36.

Where the direction of movement of a vehicle is at right angles to the axis of the tires so they may roll freely over the highway surface, the resistance to such rolling is comparatively low, but where the direction of movement is at other than such ninety degrees to the rotational axis of the tires, movement results in a lateral resistance or scuffing which tests have shown to reach as high as one hundred times the normal resistance to rolling friction of a pneumatic tire tread on certain highway surfaces.

A novel feature of this invention is the means of preserving relative alignment of all tires of the suspension through support about a central cross shaft while also taking advantage of the difference between the free rolling friction and the scuffing friction at tire contact with the ground, to create a self-steering force which changes the relative alignment between the entire suspension and the body, so as to cause the tires to roll more and to scuff less. Such change of alignment of the entire suspension as herein disclosed is always in the opposite direction from the new forward path in which the forward end of the vehicle is being then moved by its truck-tractor, thus the tendency is for all tires of this suspension to continue rolling straight ahead, while the combination of the lateral force or scuffing on the rolling tires creates a new direction of movement of the suspension over a modified path which may approximate the path of the truck-tractor or other towing means. This same lateral force or scuffing also creates axial deformation of the torsional suspension bushings to increase the self-steering effect primarily developed in the supporting rubber bushings or sandwiches.

The resiliency of tire treads and relative firmness of road surface both tend to permit a tire creep or continuing reduction in the relative misalignment between the suspension and the body, thus continued linear movement and/or, absence of scuffing results in a return to the normal alignment.

The current length of semi-trailer combinations, and the effect of bridge formulae relating gross weight to wheelbase has created a desire for the self-steering effect here invented, wherein all wheels of the suspension preserve their normal relative alignment to each other, and the inboard location of the resilient pedestal journal increases the possible angle of self-steering for a given thickness of rubber in the connections shown between the bogey and the body. Both the vertical and the angular deflections in the journal rubber bushing or sandwiches are dependent on the load which in turn controls the lateral scuffing force between the tires and ground. With a heavy load in the vehicle the rubber is compressed upward as by the cross shaft 35 to reduce the wall thickness of bushing 54 both fore and aft the vertical centerline thus increasing the resistance by the bushing to angular movement of the cross shaft 32, 80 or 137, in the journal. Likewise the same heavy load increases the frictional resistance between the tires and ground to create greater stress by the cross shaft 32, 80 or 137 to offset the increased resistance of bushing 54 and inversely so with an empty condition. Thus the relative paths of this vehicle rear suspension during a load condition may be made to approximate those during a no-load condition and in both conditions it avoids the current driving practice of making the widest possible tractor turn at right angled intersections in order to provide clearance at inside curb intersections for the inside tires of the semi-trailer suspension. The tire wear otherwise due to scuffing is hereby relieved through load controlled uniformity of self-steering. In this description the term "self-steering" has been used in its true sense, and not as frequently used to describe side sway.

Figs. 9, 10 and 11 show still another form of the structure wherein the cross shaft assembly is comprised of an intermediate tube 209 and a pair of end tubes 210 which are separately bonded to their respective rubber parts then assembled together at the bolt flanges 211 on tube 209 and flange 212 on each of tubes 210 with the projecting end of tube 210 pressed into the pilot support 213 brazed into center tube 209. In this form of suspension the two laterally-spaced resilient mounting bushings 54a are vulcanized or bonded to the center tube 209 and to the inner faces of their encasing sleeve halves 50', 51' while the flanges of said sleeve halves are spaced sufficiently apart from each other, first, to allow the rubber to shrink while cooling from the temperature of vulcanizing and second, to deform the cooled rubber by their clamping the sleeve halves 50', 51' into contact with each other to improve the bonds of the rubber bushings 54a with said sleeve halves 50', 51' on the outer diameter of the bushings, and with the intermediate tube 209 on the inner diameter of said bushings 54a. The upper sleeve half 51' will have brace attaching arms 56, 57, 58, 60 extending upwardly therefrom in the manner as shown in Fig. 2.

Each end tube 210 is provided with concentrically-disposed and radially split hubs 215, 216 and 222, 223 to which opposing suspension arms 219, 224 are respectively attached. Concentrically-disposed inner rubber bushings 214 and outer bushings 221 are interposed between the respective tube and hubs and bonded thereto while the respective halves of said hubs are spaced apart from each other to enable shrinkage of the rubber as it cools and partially draw said halves together, after which each pair of said halves may be further drawn together around each enclosed bushing to deform the rubber compressively against its bonded contacts with the surrounding metallic parts, in the manner as illustrated by comparing Figs. 10 and 11.

The inner tubular rubber bushing 214 extends the length of the radially-split hub parts 215, 216 which are identical semi-cylindrical sleeves, part 215 being provided with a pair of threaded bolting flanges 217 disposed adjacent the middle of its length and in spaced relationship to a matching pair of drilled bolting flanges 218 secured to matching hub part 216. Both ends of the hub parts 215, 216 are provided at their outer diameter for engagement of clamping rings 220 when the adjacent faces of said hub parts are forced into contact, thus the inherently rigid semi-cylindrical sleeves 215, 216 may be effectively clamped together by capscrews 225 passing through flanges 218 and threaded into flanges 217 at the middle of the hub length, and by the clamping rings 220 at each end thereof. The suspension arm 219 is welded to hub part 216 in line with bolting flange 218. Externally of said hub halves 215, 216 and spaced beyond the centrally located bolting flanges 217, 218 pairs of tubular rubber bushings 221 extend to the inner end of the space for the clamping rings 220. Extending over the length of the pair of bushings 221 and opposite the suspension arm 219 of the inner hub is a radially split or semi-cylindrical sleeve 222 bonded to said bushings 221 and clampable compressively thereto by companion split sleeve caps 223 which are likewise bonded to said bushings 221 while parts 222 and 223 are spaced apart slightly more than they may be drawn together by shrinkage of the rubber. After the rubber cools to atmospheric temperature the outer hub parts 222, 223 may be drawn together by the bolts 226 to compressively deform the outer bushings 221 against their bonded contacts with the surrounding metallic parts. The suspension arm 224 is welded to the center of the length of the split sleeve 222 and in line with its opposing arm 219.

The relationship of components of this suspension provides completely bonded and compressively deformed contact of the rubber bushings in torsional angular shear with the concentrically nested hubs and cross shaft, whereby the cycle operating life at a given torque capacity is increased.

In all forms of the invention, the vertical load is taken by the several torsional bushings on the cross shaft and in addition in certain of the forms by cushioning members in the pedestal and mounting structures. The suspension arms on each side of the bogey are connected to one another through these torsional bushings in angular shear and to the pedestals. The bushings are arranged in pairs and respectively lie at the opposite side of the suspension arms to provide a balanced biased arrangement.

The opposing inner bushings are provided on the cross shaft and will resiliently transfer torque between the suspension arm structures on opposite ends of the cross shaft and allow restrained independent movement of said suspension arms at the opposite sides of the vehicle.

In Figs. 1 to 7 inclusive, there is shown a self-leveling feature of the invention wherein a movement of the suspension arm 61 attached to tube 35 is resiliently transmitted through the torsional connection in the cross shaft 32, Fig. 5, to matching arm 61 attached to tube 36 on the opposite side of the bogey, and will tend to stabilize transverse vertical alignment of the vehicle when subjected to transverse imbalance of load and/or vertical variations in the road surface.

Fig. 8 illustrates the combination of a modification in which the suspension structure of Fig. 1 is combined with an end connection with a pair of rubber bushings connected to the wheel arms. The reference characters of this figure have already been referred to and the two tubes comprising the cross shaft structure are identified by 36 and 209.

The trailing pair of tires on each side of the suspension control rolling alignment of the leading tires on same side, rather than using duplicate and separate installations of trailing tires only and wherein self leveling is omitted.

Each tire, wheel and brake drum assembly rotates independently of the other tire, wheel and brake assemblies and thereby lessens the rolling resistance and avoids the scuffing incumbent with conventional dual tire assemblies on a single wheel. Each wheel and tire is so supported as to be balanced to the path of resistance encountered during movement of the vehicle, and the alignment of all tires is at all times preserved. A tire of one size smaller cross section than is otherwise used, thereby gives an increased tire load mileage by complete freedom of rotation of each tire, and also by the self-steering feature of the entire suspension on curves and turns as the balanced relationship of support to each tire's resistance is always maintained.

The absence of full width axles, radius rods, torque arms and brackets therefor, leaf springs with shackles, brackets and seats, and the use of smaller tires for a given load mileage, makes for an economy of tare weight to increase its legal payroll capacity. Tires on the free end of any one suspension arm negotiate road irregularities independently of the tires on any other arm, and unequal tire loading is avoided at opposite side of vehicle from obstacle encountered, such as results where four tires are mounted on a rigid axle extending across width of the vehicle. Stabilization of suspension torque reactions between the opposing arms of each pair, reduces the torque bushing capacity to fifty percent of the capacity required where the torque suspension arms may be separately secured to torque bushings. Each suspension arm serves as its own radius rod to the wheels, tires and brakes that are mounted thereon, and also serves as its own torque arm for brake torque and suspension torque reactions. The need for lubrication or fittings required for movable joints of a suspension and its connection to the frame or body of the vehicle, is eliminated.

Where the rubber bushings are shown as vulcanized, it is to be understood that they may be secured by other suitable means.

While various changes may be made in the detailed construction, it shall be understood that such changes shall be within the spirit and scope of the present invention as defined by the appended claims.

What is claimed is:

1. In a wheel suspension, a cross shaft having divided parts and a resilient torque connection disposed between the divided parts of the cross shaft, pairs of laterally-spaced rubber bushings secured to the respective outer ends of the cross shaft, a wheel suspension arm rigidly secured to the cross shaft between each of the rubber bushings, of a pair, a wheel suspension arm extending in an opposite longitudinal-aligned direction therefrom and clamp parts bridging said first mentioned suspension arm and secured to the rubber bushings, whereby each suspension arm on each side of the bogey is resiliently resisted by its opposed suspension arm on that side of the bogey and by the suspension arms on the opposite side of the bogey, and resilient means on the respective divided parts of the cross shaft adapted for the attachment of the bogey to the underside of the vehicle.

2. In a wheel suspension as defined in claim 1, and said resilient torque connection comprising a sleeve bolt disposed internally within the ends of the divided parts, opposingly tapered rubber bushings carried on the sleeve, an annular rubber ring disposed between the inner ends of the bushings and the inner ends of the divided cross shaft parts and fastening means on the bolt for endwise compressing the tapered bushings on the sleeve to engage the interior of the divided parts so that they may be placed in resilient rotational shear through the bushings.

3. In a wheel suspension as defined in claim 2, and said sleeve for the torsion connection between the divided shafts having one end notched, said fastening means including a nut secured in the end of said sleeve, a washer having internal serrations adapted to be fitted in the notched end of the sleeve and a bolt engageable with said nut and said washer to force the washer into tight locking engagement with the end of the bushing and to hold it against rotation upon said sleeve.

4. In a self-steering wheel suspension, two opposing torque reactive, resiliently interconnected, longitudinally aligned, wheel carrying suspension arm structures adapted to be respectively disposed at the respective opposite sides of a vehicle, a torque reactive cross shaft structure interconnecting the suspension arm structures, said cross structure having divided parts and a resilient torque connection disposed between the divided parts, and a resilient mounting structure on each of the divided parts of the cross shaft structure respectively lying inboard of the respective suspension arm structures for securing the wheel suspension to the vehicle.

5. In a self-steering vehicle wheel suspension, a cross shaft structure having divided parts and a resilient connection between the divided parts, a wheel carrying arm adapted to extend longitudinally of the vehicle secured to each of the divided parts of the shaft, a tubular rubber bushing bonded to the cross shaft at each side of the vehicle, a hub secured to each rubber bushing, a second wheel carrying arm extending from the hub in the opposite direction from the first arm but longitudinally aligned therewith and a resilient mounting structure on each of the divided parts of the cross shaft structure by which the wheel suspension will be secured to the vehicle.

6. In a self-steering vehicle wheel suspension a cross shaft structure having divided parts and a resilient torque connection between the divided parts, a tubular rubber bushing bonded to the cross shaft at each side of the vehicle, a hub surrounding said rubber bushing and secured thereto, a longitudinally disposed wheel carrying arm extending from said hub, a second rubber bushing surrounding said first hub and secured thereto, a second hub surrounding the second rubber bushing and secured thereto, a second wheel carrying arm extending from the second hub in the opposite direction from the first arm but longitudinally aligned therewith and resilient means on the cross shaft structure for securing the wheel suspension to the vehicle.

7. In a self-steering vehicle wheel suspension as defined in claim 4, and said resilient torque connection comprising a centering member disposed on one of the divided parts and a centering sleeve disposed on the other of the divided parts, said parts including the member and the sleeve resiliently connected together, and rubber bushings bonded to the ends of the divided parts and a split sleeve surround the rubber bushings and joining the same together.

References Cited in the file of this patent

UNITED STATES PATENTS

| | | |
|---|---|---|
| 1,739,450 | Fageol | Dec. 10, 1929 |
| 1,930,208 | Marcum | Oct. 10, 1933 |
| 2,051,864 | Knox | Aug. 25, 1936 |
| 2,286,609 | Ledwinka | June 16, 1942 |
| 2,371,864 | Woolson | Mar. 4, 1945 |
| 2,613,954 | Avila | Oct. 14, 1952 |
| 2,738,203 | Misic | Mar. 13, 1956 |